US008388285B2

(12) United States Patent
Langh (10) Patent No.: US 8,388,285 B2
(45) Date of Patent: Mar. 5, 2013

(54) ARRANGEMENT FOR SUPPORTING LOAD IN TRANSPORTATION UNIT (75) Inventor: Hans Langh, Piikkio (FI)

(73) Assignee: Oy Langh Ship Ab, Piikkio (FI)

(*) Notice: Subject to any disclaimer, the term of this patent is extended or adjusted under 35 U.S.C. 154(b) by 247 days.

(21) Appl. No.: 12/820,302

(22) Filed: Jun. 22, 2010

(65) Prior Publication Data
US 2010/0329809 A1 Dec. 30, 2010

Related U.S. Application Data
(63) Continuation-in-part of application No. PCT/FI2010/050112, filed on Feb. 19, 2010.

(30) Foreign Application Priority Data
Feb. 19, 2009 (FI) .................................... 20095156

(51) Int. Cl.
B60P 7/08 (2006.01)
(52) U.S. Cl. ................ 410/50; 410/32; 410/36; 410/47; 410/49; 410/89; 410/144; 410/150
(58) Field of Classification Search .................... 410/32, 410/34, 35, 36, 42, 47, 49, 50, 48, 89, 96, 410/97, 143, 144, 150, 30; 206/389, 446, 206/391, 394; 105/355; 248/351, 354.1
See application file for complete search history.

(56) References Cited

U.S. PATENT DOCUMENTS

| 2,859,710 A | 11/1958 | Elsner |
| 2,983,231 A | 5/1961 | Henrikson |
| 3,677,562 A | 7/1972 | Bronstein |
| 5,211,518 A * | 5/1993 | Mimica .......................... 410/50 |
| 2003/0161700 A1 | 8/2003 | Moore |
| 2006/0051178 A1 | 3/2006 | Scott |
| 2007/0110539 A1 | 5/2007 | Klinkman |
| 2007/0234928 A1 | 10/2007 | Al-Kaabi et al. |

FOREIGN PATENT DOCUMENTS

| DE | 3331348 A1 | 5/1984 |
| DE | 19930763 A1 | 2/2001 |
| EP | 0 130 663 A1 | 11/1986 |
| EP | 1 182 082 A1 | 2/2002 |
| EP | 1661758 A2 | 5/2006 |
| GB | 815 009 A | 6/1959 |
| GB | 1 019 239 A | 2/1966 |
| JP | 63-139042 U | 9/1988 |

OTHER PUBLICATIONS

Finnish Search Report, dated Dec. 31, 2009, from corresponding Finnish application.
International Search Report, dated Apr. 20, 2010, from corresponding PCT application.
European Search Report in connection with Application No. 10166603.0-1268 mailed Dec. 15, 2010.

* cited by examiner

Primary Examiner — Stephen Gordon
(74) Attorney, Agent, or Firm — Young & Thompson (57) ABSTRACT A support arrangement for supporting load in a transportation unit, includes a rod-like support member placed beside the load to support it and two parallel rails in the longitudinal direction of the transportation unit and at a distance from each other. The support member includes support ends for fastening to support points in the transportation unit so that the support member is perpendicular to the longitudinal axis of the transportation unit. Safe and easily implemented support for the load to be transported is achieved by arranging the support member to move along the inner walls of the rails and guided by the inner walls to set it against the load. The support arrangement includes an elongated flexible member and a tightening element for tightening the elongated flexible member against the load so that displacement of the load in relation to the rod-like member is prevented.

19 Claims, 6 Drawing Sheets

ARRANGEMENT FOR SUPPORTING LOAD IN TRANSPORTATION UNIT

RELATED APPLICATION

This is a continuation-in-part (CIP) of International PCT Application PCT/FI2010/050112, filed on Feb. 19, 2010, which claims priority to Finnish Application No. 20095156 filed on Feb. 19, 2009. The entire contents of each of the above-identified applications are hereby incorporated by reference.

BACKGROUND OF THE INVENTION

The invention relate to a support arrangement for supporting load in a transportation unit, such as container or vehicle for transporting load, the support arrangement comprising a rod-like support member and a first and a second rail which forms longitudinal grooves and support points arranged in the longitudinal direction of the rails for receiving the support member at a given support point beside the load to support it, the rod-like support member comprising a first support end for positioning to a first support point in the first rail and a second support end opposite to the first support end for positioning to a second support point in the second rail so that the rod-like support member is at right angles to the longitudinal axis of the transportation unit.

This type of support arrangement is known from publication DE 3331348 A1. The wall structure of the rails of the support arrangement has been provided with several openings in order to receive the rod-like support member and lock it into given spots of the rails. A problem with the support arrangement is that it cannot support and tighten the load to be supported in such a way to avoid harmful displacements of the load to be supported, if the transportation unit moves back and forth during transportation. Harmful displacements include here typically such displacements or movements which cause the load to overturn and which bring about large impact loads on the rod-like support member. The support arrangement does not enable to position and lock the rod-like support member against the load, on both sides of the load in such a way that the load would be supported substantially without clearance by both support member simultaneously. Even a small gap or clearance between the support members and the load causes great loads on both the support members and the load if the load moves back and forth for instance during sea transport in rough seas. Such a gap will inevitably always develop in this known support arrangement if the load comprises a casing which will be pressed and shrink somewhat owing to external forces.

The transportation and supporting of a high, narrow and heavy load with known support arrangements has proven to be especially problematic. Examples of such a load are heavy and narrow metal reels having a large diameter. Their transport and supporting has proven difficult especially in lorries, but also in trains, ships and airplanes, in which the reels are typically transported in containers.

BRIEF DESCRIPTION OF THE INVENTION

It is an object of the invention to provide a new support arrangement that eliminates the above-mentioned prior-art problems and permits safe support for high and narrow loads when the loads are transported in different transportation units, such as different vehicles and transportation means.

To implement this, the invention provides a support arrangement for supporting load in a transportation unit, such as container or vehicle for transporting load, the support arrangement comprising a rod-like support member and a first and a second rail parallel to the longitudinal axis of the transportation unit, which comprise a wall structure which forms longitudinal grooves and support points arranged in the longitudinal direction of the rails for receiving the support member at a given support point beside the load to support it, the rod-like support member comprising a first support end for positioning to a first support point in the first rail and a second support end opposite to the first support end for positioning to a second support point in the second rail so that the rod-like support member is at right angles to the longitudinal axis of the transportation, wherein the rod-like support member is arranged to be displaceable along the rails guided by the longitudinal inner walls of the grooves of the rails, and the support arrangement comprises an elongated flexible member and a tightening means for tightening the elongated flexible member against the load to be supported so that displacement of the load in relation to the rod-like member is prevented.

According to a preferable embodiment of the invention the first support end of the rod-like support member is adapted to be fastened to the first support point in the first rail and the second support end of the rod-like support member is adapted to be fastened to the second support point in the second rail for positioning the rod-like support member in a locked position in which its free movement in the longitudinal direction of the transportation unit is prevented, an inner wall structure of the longitudinal grooves of the rails form said support points when the rod-like support member is in its locked position, the first support end and the second support end of the rod-like support member each comprising two gripping edges arranged diametrically to each other, which are arranged to bite into the inner walls of the longitudinal grooves of the rails when the rod-like support member is in its locked position, the inner walls forming for the support ends said support points and the elongated flexible support member is arranged to turn the rod-like support member and its support ends so that the gripping edges of the rod-like support member wedge by biting into the inner walls of the grooves of the rails to bring the rod-like support member into its locked position the rod-like support member comprising power transmission brackets in cooperation with the elongated flexible member, which are arranged to transmit a torque to the rod-like support member for turning it, when the elongated flexible member is tightened with tightening means connected thereto and arranged to uphold a torque exerted on the rod-like support member and keep the rod-like support member in its locked position so that its free movement relative to the transportation unit is prevented. Such an embodiment keeps the load in place in the transportation unit and prevents the load from being displaced relative to the longitudinal axis of the transportation unit.

A great advantage of the support arrangement of the invention is that it makes it possible to securely support different loads, even a high and narrow load, in different types of transportation units so that the load cannot during transportation move in the transportation unit. When the elongated flexible member is also arranged around the load to be supported, the load to be supported can be pressed between the support member and elongated flexible member when the elongated flexible member is tightened with the tightening means. If, in the embodiment of the invention comprising a rod-like support member whose support ends comprise diametrical gripping edges, the load strives at moving during transportation, the load causes to the elongated flexible member of the support arrangement a force that endeavors to turn the rod-like support member and makes the gripping edges of the rod-like support member to lock even tighter to the support points in the transportation unit, that is, to the longitudinal inner walls of the grooves of the rails, which inner walls receive the gripping edges. Thus, the support arrangement is self-tightening, which is a great advantage when compared to known support arrangements. The support arrangement also provides the advantage that it is easy and quick to arrange around the load to be transported to support it. Thanks to being self-tightening the gripping edges are caused to grip even to smooth inner walls. Because the elongated flexible member and the tightening means flex elastically, the gripping force of the gripping edges to the inner walls prevails even if slight changes occurred in the outer dimensions of the supported load during transportation. The outer dimensions of the load may slightly change due to the fact, for example, that the packaging material of the load compresses slightly when stresses are directed to it during transportation. Thus, the elongated flexible member and the tightening means attached thereto ensure that the support rod and load to be supported remain stationary in all situations. Because the support provided by the support arrangement is extremely secure, the load may be heavy; an example of which is large-diameter narrow metal reels.

BRIEF DESCRIPTION OF FIGURES

In the following, the invention will be described in greater detail by means of an example and by referring to the attached drawing, in which FIG. 5 is an end view of an alternative support rod embodiment to that of FIG. 4, FIGS. 15 and 16 illustrate how a reel is supported in the cargo space of a lorry by using the support arrangement of the invention, as seen from the end and side, respectively, FIG. 17 is a side view of a support rod used in the support arrangement of FIGS. 15 and 16, and FIG. 18 illustrates a rail and groove for receiving a support rod, which belong to the support arrangement of FIGS. 15 and 16, FIG. 19 illustrates the construction of the rail in FIG. 18, and FIGS. 20 and 21 illustrate an alternative embodiment of the support rod of the support arrangement a seen from the side and end, respectively.

DETAILED DESCRIPTION OF THE INVENTION

Figure 1:
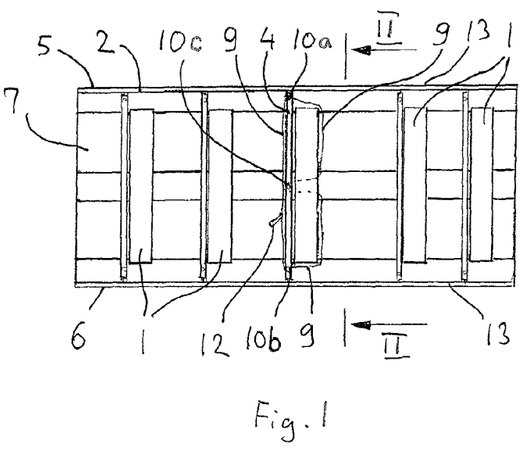
FIG. 1 is a top view of an arrangement of the invention for supporting reels in a transportation unit.

FIG. 1 is a top view of a container 2, in which five metal reels 1 have been loaded. The container 2 is not loaded full of reels, because its strength would not be sufficient to carry a large number of reels. The diameter of the reels 1 is approximately 190 cm and their width is approximately 30 cm. As shown in the figure, the reels are arranged at a distance from each other, whereby they load the container evenly.

Figure 2:
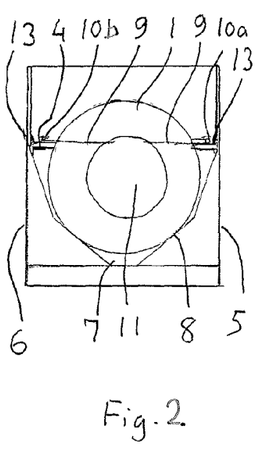
FIG. 2 shows a section along line II-II of FIG. 1, FIGS. 3 and 4 are end and side views, respectively, of a support rod used in the support arrangement of FIGS. 1 and 2.

FIG. 2 shows a section along line II-II of FIG. 1. FIGS. 1 and 2 show that the reels 1 are arranged in a chute 7 that extends from one end of the container to the other. The chute 7 comprises oblique support surfaces 8, to which the mantle surface of the reel 1 is supported.

Each reel 1 is supported with a support arrangement that comprises a support rod 4 and rope 9. The support rod 4 supports the reel 1 on one side and the rope 9 is wound around the reel 1 such that it supports the reel on the opposite side. The rope 9 is fastened to a first bracket 10$a$ on one end of the support rod 4, then guided on the outside behind the reel 1 and through the hole 11 in the reel to a bracket 10$b$ in the middle of the support rod, then back behind the reel and through the hole 11 of the reel back to a bracket 10$c$ on the other, opposite end of the support rod, and the rope 9 ends in the bracket 10$a$. A tightening means, for instance rigging screw 12, is arranged to the rope 9 to tighten the rope 9. The purpose of the tightening is to lock the support rod into rails 13 on walls 5, 6 of the transportation unit. Because the brackets 10$a$, 10$b$, 10$c$ act as lever arms to turn the support rod 4, the brackets 10$a$, 10$b$, 10$c$ may be called power transmission brackets or moment transmission brackets.

Figure 3:
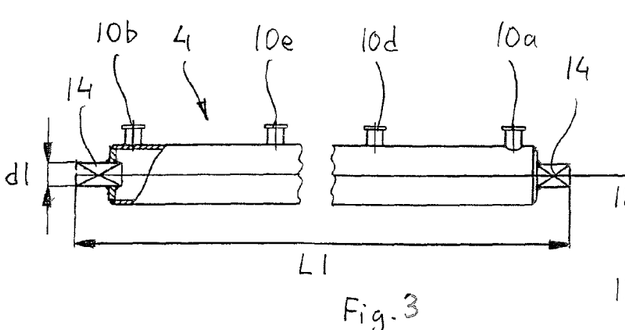
Figures 4, 5:
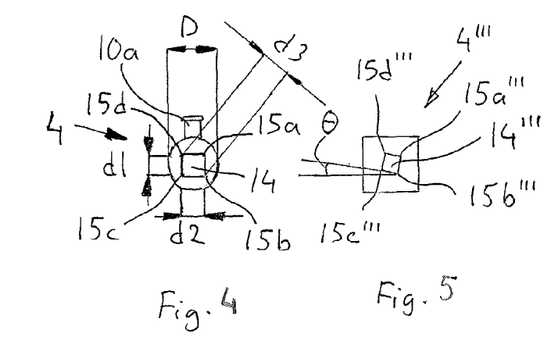

FIGS. 3 and 4 show the support rod 4 in more detail. The number of brackets 10$a$, 10$c$, 10$d$, 10$e$ in the support rod may vary. When there are several brackets, the rope may be fastened/guided to more than one point of the support rod 4, which increases the suitability of the support rod in supporting loads of different type and also makes it possible to support the load in a direction that is perpendicular to the direction of movement of the transportation unit, that is, perpendicular to the longitudinal direction of the transportation unit. The total length L1 of the support rod 4 is selected such that it extends between the opposite walls 5, 6 of the transportation unit. The length L1 is approximately 2300 mm when the transportation unit 2 is a container. At the opposite ends of the support rod 4, there are support ends 14 that are rectangular in cross-section, as shown in FIG. 4.

Figure 7:
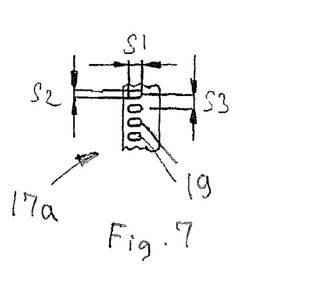
Figure 8:
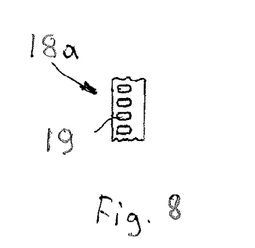
Figure 9:
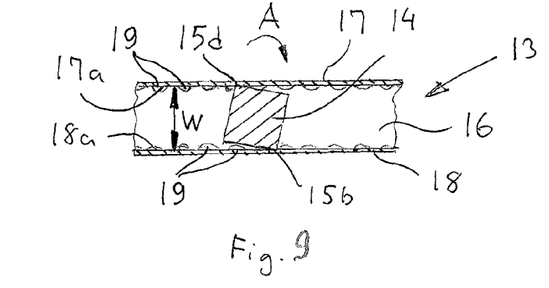
FIG. 9 illustrates how the support rod of FIGS. 3 to 5 locks into the transportation unit.

FIGS. 1 to 8 show that the diametrically opposite corners of the support end 14 form gripping edges 15$a$, 15$b$, 15$c$ and 15$d$ that lock into the rails 13 on the walls 5, 6 of the container. The gripping edges lock by wedging to the rails 13, as illustrated in particular in FIG. 9 showing that the gripping edges 15$b$ and 15$d$ of the support end 14 are locked onto the smooth inner walls 17$a$, 18$a$ of the top 17 and bottom walls 18 of the rail 13. The more the rope (see rope 9 of FIGS. 1 and 2) is tightened, the more the support rod 4 turns in the turning direction of arrow A in FIG. 9, and the more the gripping edges 15$b$ and 15$d$ bite into the inner wall 17$a$, 18$a$ of the walls (wall construction) 17, 18 and prevent the movement of the support rod in the longitudinal direction of the rail 13. In a way, the gripping edges 15$b$, 15$d$ cut into the inner walls 17$a$, 18$a$ and lock the support rod 4 in place so that it is in its locked position. When the tightening rope (rope 9 in FIGS. 1 and 2) is also wound around the load to be supported (that is, reels 1, 1', 1" in FIGS. 1, 2, 10 to 16), the load is pressed between the support rod and tightening rope. In addition, thanks to the yield of the tightening rope (the rope yields in practice and is not completely rigid), the biting force of the gripping edges 15b, 15d into the inner walls 17a, 18a prevails even if slight changes occurred in the outer dimensions of the supported load (that is, reels 1, 1', 1" in FIGS. 1, 2, 10 to 16) during transportation. The outer dimensions of the load may slightly change due to the fact, for example, that the packaging material of the load compresses slightly at some points when repeated stresses are directed to it during transportation. Thus, the tightening rope ensures that the support rod 4 and load to be supported remain stationary in all situations.

Figure 12:
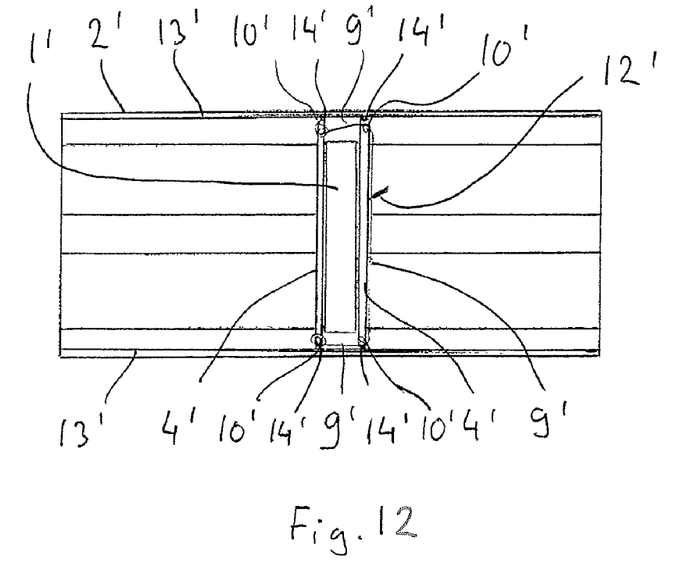
FIG. 12 is an alternative embodiment to that of FIG. 1 for supporting a reel in a transportation unit.

FIG. 7 shows the inner wall 17a of an upper part of the rail 13. One can see that the inner wall 17a comprises consecutive teeth 19. The dimensions of the teeth are S1=20 mm, S2=10 mm, and the internal distance between the teeth is S3=20 mm. Such a density of the teeth enables that the support rod in practice can be positioned close enough to the load to be supported, also if support rods are positioned on both sides of the load (c.f. FIG. 12). The tooth system is strived to be as dense as possible, whereby the support rod 4 can be positioned as close as possible to the load 1 to be supported, FIG. 8 shows the inner wall 18a of an lower part of the rail 13. The inner wall 18a comprises similar consecutive teeth 19 as are found in the inner wall 17a of the upper part of the rail, c.f. FIG. 7. When the reel 1 is fastened with only one support rod 4, as shown in FIGS. 1 and 2, a tooth system (teeth 19) is provided both in the inner wall 17a of the upper part of the rail and in the inner wall 18a of the lower part of the rail.

Owing to the fact that the tightening rope is tightened also if the load to be supported strives to displace during transportation, the support arrangement is self tightening. Thanks to being self tightening, one could think to design smooth inner walls 17a and 18a, i.e. inner walls 17a, 18a without teeth or other protrusions or dents. Smooth inner walls would enable to position without any clearance the support rod against the load to be supported.

Figure 6:
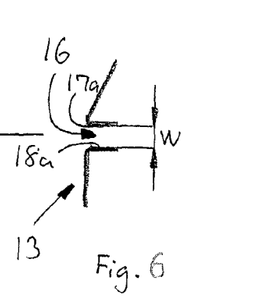
FIG. 6 illustrates a rail and groove for receiving a support rod, which belong to the support arrangement of FIGS. 1 and 2, FIGS. 7 and 8 illustrate the construction of the inner walls of the rail in FIG. 6.

The rail 13 is made of a steel sheet that is edged. The hardness and strength of the steel sheet are smaller than the hardness and strength of the gripping edges 15a, 15b, 15c and 15d of the gripping end 14. The thickness of the steel sheet is 4 mm, for instance, and its yield strength is 355 MPa. The gripping end 14 of the support rod 4 is preferably made of steel. The yield strength of the gripping edges 15a, 15b, 15c, 15d of the support end is in the range of 1000 MPa. When the hardness and strength of the gripping edges 15a, 15b, 15c, 15d are greater than the hardness and strength of the rail, the gripping edges bite and cut well into the smooth walls 17a, 18a of the rail. It is thinkable that the rails are made of aluminium, because it is light and relatively soft. Other metals may also be considered as the manufacturing material of the rail 13.

The diameter d1 of the support end 14 of the support rod 4 is slightly smaller that the width W of the rail groove 16, whereby the gripping end 14 of the support rod 4 may freely move in the groove 16 of the rail 13 in the longitudinal direction. For example, d1=30 mm and W=35 mm. The diameter d2 of the support end 14 is 35 mm, for instance. The largest diameter d3 of the support end 14 is larger than the width W of the rail groove 16, whereby the gripping edges 15b, 15d of the support end 14 may grip and bite into the inner walls 17a, 18a of the rail 13. When the support rod 4 is turned, see FIG. 9. The length of the support end 14 is 50 mm. The diameter D of the support rod 4 is approximately 70 mm.

FIG. 5 shows an alternative to the round shape of the support rod 4". The support rod 4''' of FIG. 5 is rectangular in shape. The support rod 4''' of FIG. 5 provides the advantage over the support rod of FIG. 4 that its strength and rigidity can be made great relative to its weight, whereby it is lighter than a round support rod and thus easier to handle when mounted in place or detached. FIG. 5 shows that the plane of the support end 14''' is preferably at a small angle θ to the plane of the support rod 4". The angle θ is preferably 2 to 10 degrees. Thanks to the angle θ, the plane of the support rod 4''' settles perpendicular to the load to be supported when the support end 14''' is in its locked position and slightly obliquely (see FIG. 9) in the groove 16 of the rail 13.

Figure 10:
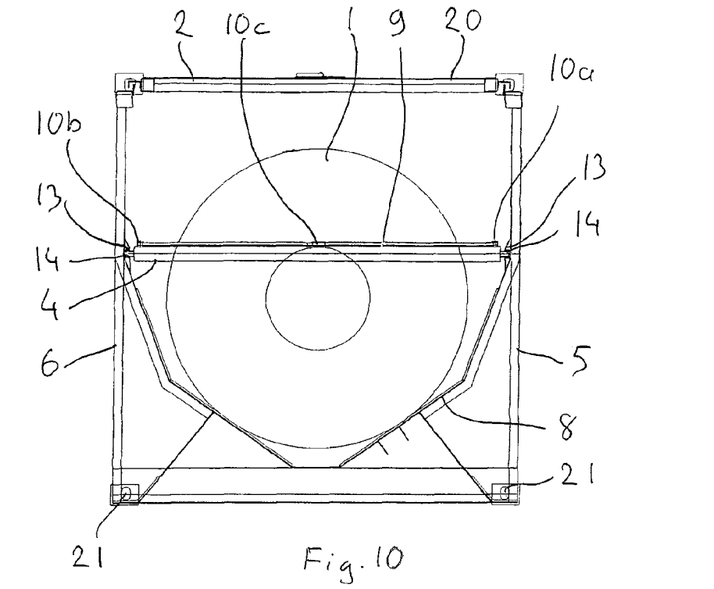
FIGS. 10 and 11 show in more detail than FIGS. 1 and 2 how a reel is supported in a transportation unit of FIGS. 1 and 2, as seen from the end and side, respectively.
Figure 11:
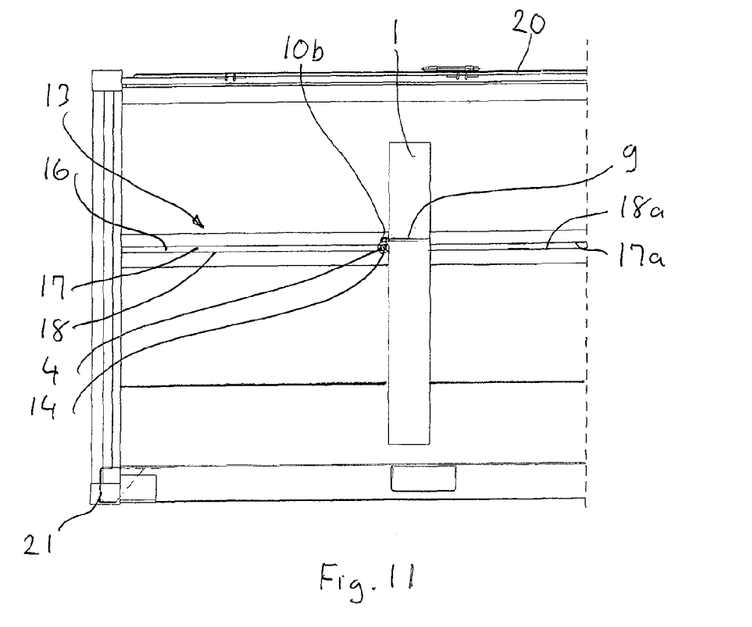

FIGS. 10 and 11 show the solution of the invention in more detail than in FIG. 2. FIGS. 10 and 11 use the same reference numbers as FIG. 2. FIG. 10 shows that the transportation unit is a container that comprises an opening roof 20. The fastening points of the container to the base (not shown) are indicated by reference number 21. The figure also shows that the support ends 14 of the support rod 4 are arranged in the groove 16 in the rail.

Figure 13:
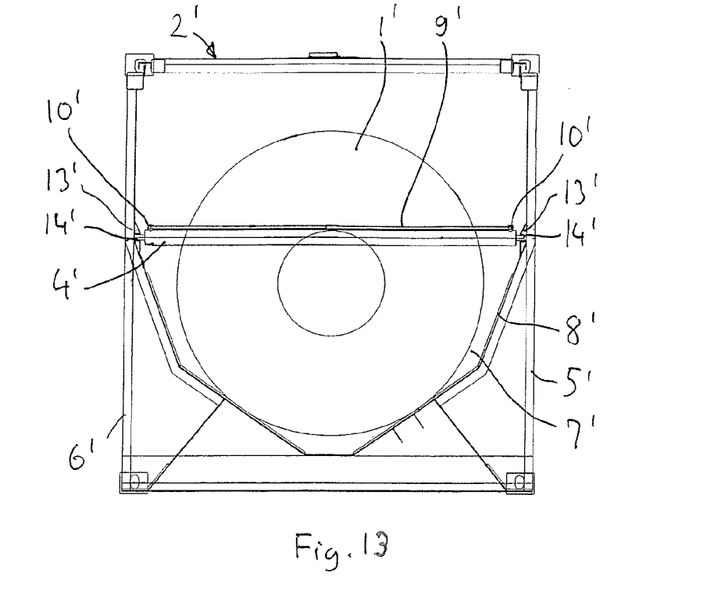
FIGS. 13 and 14 show in more detail than FIG. 12 how a reel is supported in a transportation unit of FIG. 12, as seen from the end and side, respectively.
Figure 14:
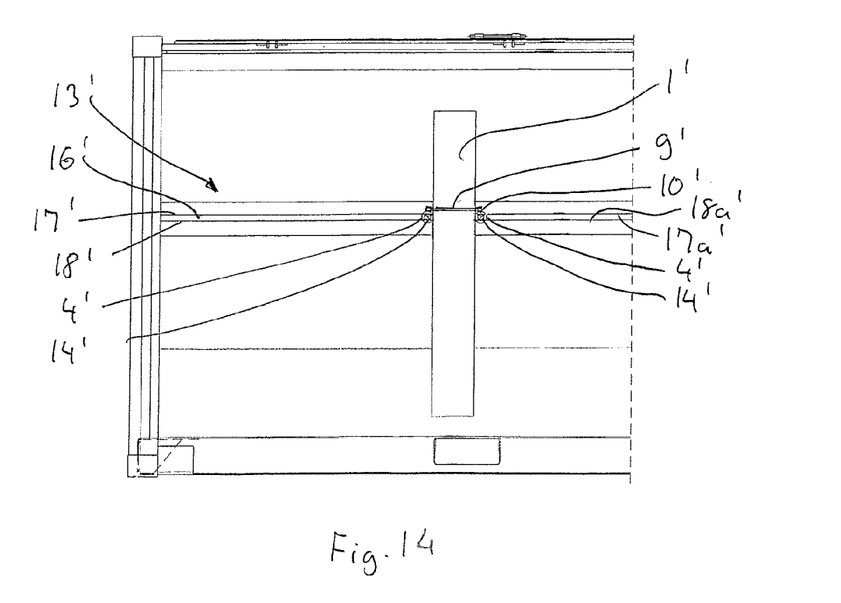

FIGS. 12 to 14 show an alternative support arrangement for supporting a reel 1 to that shown in FIGS. 1, 10 and 11. The arrangement of FIGS. 12 to 14 differs from that shown in FIGS. 1, 10 and 11 in that on both sides of the reel 1, support rods 4' are arranged and the rope 9' is guided in a different manner than in FIGS. 1, 10 and 11. The rope 9' is guided to brackets 10' at the ends of the support rods 4', thus connecting them operationally to each other. When the rope 9' is tightened with tightening means 12', the support rods 4' turn in such a manner that the gripping edges of their support ends lock into the inner walls 17a', 18a' of the groove 16' of the rail 13'.

Figures 15, 16, 17, 18, 19, 20, 21:
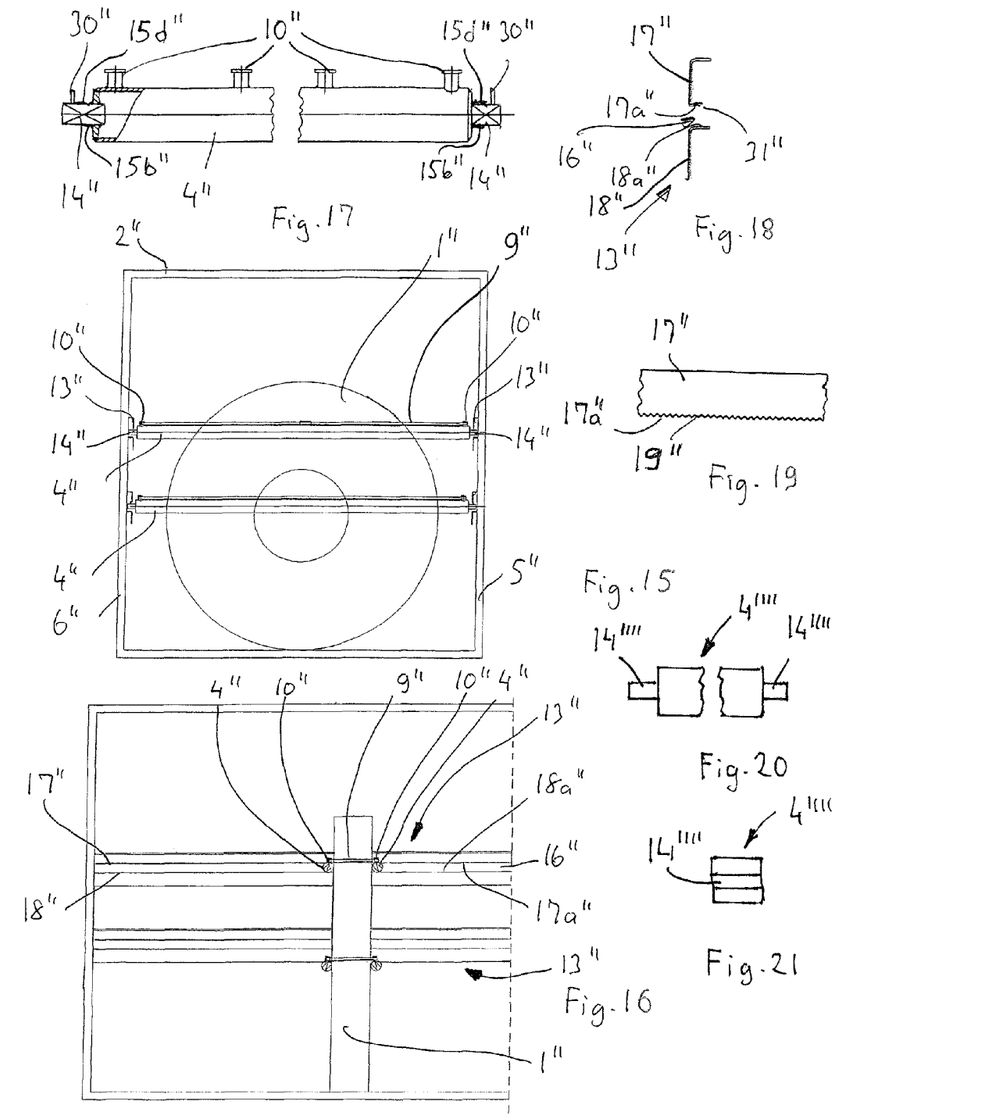

FIGS. 15 to 19 show a support arrangement of a load, which in FIGS. 15 and 16 is a reel 1, in the cargo space of a lorry or the like.

FIGS. 15 to 19 use the same reference numbers as FIGS. 31 to 14 for the corresponding components.

The arrangement of FIGS. 15 to 19 differs from that of FIGS. 1 to 14 in that the support ends 14" of the support rods 4" have locking tongues 30" that are arranged to lock into the rails 13" in such a manner that the rails 13" on the opposite walls 5" and 6" of the transport unit 2" cannot in use move away from each other so that the support ends 14" of the support rod 4" would detach from the rails 13". Thus, the support rods 4" stiffen the transportation unit. The support end 14" of the support rod 4" may be arranged inside the groove 16" of the rail 13" by turning its locking tongue 30" parallel to the groove 16" of the rail 13", after which the support end 14" of the support rod 4" may be pushed inside the groove 16". After this, the support rod 4" is turned approximately 90 degrees so that the locking tongue 30" settles behind the top wall 17" of the rail in a locked position, whereby the edge of the top wall 17" forms a locking stopper 31". Turning of the support rod 4" about 90 degrees is possible, because each support end 14" of the support rod has only two diametrically located gripping edges 15b''', 15d''' and the section of the support ends is generally a circle.

The profile of the rail 13" differs from the profile of rail 13 of FIG. 6. The upper wall 17a of the rail comprises a dense tooth system 19" which is illustrated in FIG. 19. The tooth system 19" is so dense that one may say that the adjustment and positioning of the support rod 4" on the desired place can be said to be stepless and continuous. This enables to position the support rod always directly against the load 1" to be supported and transported. Thanks to the fact that the support rod can be positioned and locked against the load so that there is no clearance between the load and the support supporting the load, no great impact forces on the support bar or on the load to be supported owing to any displacement of the load to be supported during transportation can take place.

The arrangement of FIGS. 15 to 19 further differs from that of FIGS. 1 to 14 in that it uses two pairs of support rods 4" arranged at different heights in the cargo space of the transportation unit 2" to support the reel 1. The arrangement provides for the load a more even support, and strains less the wall structure of the transportation unit 2" and its rails 13".

Above, the invention is described only by means of examples. Therefore, it is remarked that the invention may in many ways differ in detail within the scope of the attached claims. To use a wider expression, the support rod may be a rod-like support member, the geometry of which may differ from that of a rod. Thus, the design of the support rod and its support end may vary. The number of power transmission brackets in the support rod may vary, and the number of gripping edges in the support end may be only two, whereby these are arranged diametrically to each other. Instead of a rope, some other long flexible member may be used, such as tightening belts or chain, to tighten the support rod into its locked position. The profile of the rails may vary from what is stated herein. It is thinkable that the support rods are arranged vertically in the transportation unit instead of or in addition to the presented horizontal positioning. In FIGS. 20 and 21 is illustrated an embodiment of the rod-like support member 4''' having no gripping edges or power transmission brackets. The embodiment is especially well suited for being used for transport by land, such as for railway wagons, against which impact forces may hit during a possible collision. The load to be supported can be supported in the railway wagon (or other transport unit) by arranging on opposite sides of the load a support rod 4"" (or other rod-like support member), according to FIGS. 20 and 21. The support rods 4"" are connected to each other with an elongated flexible member which is tightened with tightening means (c.f. tightening means 12 in FIG. 1) so that a compressive force will act on the load. If the transportation unit during transportation hits on an obstacle, the support rods will prevent the load from tilting and crashing. The load may somewhat slide (e.g. one feet) along the bottom of the transportation unit, whereby, at the same time, the support ends 14"" of the support rod 4"" slide along the grooves of the rails in which the support ends are located (c.f. FIG. 13). In addition to collision speed, the friction against the support beneath will greatly determine the slide length. Even if the load to be supported may slide, this in not harmful or dangerous, and the load does not become damaged owing to the fact that it does not tilt. Because the support ends 14"" enable slide of the support rod also when the load is supported, they can be called slide guides. It can be contemplated that the support rods of FIGS. 3, 5 an 17 may be used in such a way that their support ends function as slide guides. In such a situation one does not use the gripping edges or the power transmission brackets in order to create any torque on the support rod for locking it, but only such a support is achieved that prevents the load from tilting.

The invention claimed is:

1. A support arrangement for supporting load in a transportation unit, comprising:
    a rod support member comprising a first support end and a second support end;
    a first rail and a second rail parallel to a longitudinal axis of the transportation unit, each rail comprising a wall structure which forms longitudinal grooves and support points arranged in a longitudinal direction of the rails for receiving the rod support member at a given support point beside the load to support the rod support member;
    a first support point in the first rail for positioning the first support end; and
    a second support point in the second rail for positioning the second support end so that the rod member is at right angles to the longitudinal axis of the transportation unit;
    longitudinal inner walls of the longitudinal grooves of the rails configured so that the rod support member is arranged to be displaceable along the first and second rails guided by the longitudinal inner walls of the longitudinal grooves of the rails;
    an elongated flexible member; and
    means for tightening the elongated flexible member in such a way that the load is pressed between the rod support member and the elongated flexible member, the rod support member supporting the load on one side and the elongated flexible member supporting the load on an opposite side.

2. The support arrangement as claimed in claim 1, wherein
    the first support end of the rod support member is adapted to be fastened to the first support point in the first rail and the second support end of the rod support member is adapted to be fastened to the second support point in the second rail for positioning the rod support member in a locked position in which free movement in the longitudinal direction of the transportation unit is prevented,
    the inner wall of the longitudinal grooves of the first and second rails form said support points when the rod support member is in its locked position,
    the first support end and the second support end of the rod support member each comprising two gripping edges arranged diametrically to each other, which are arranged to bite into the longitudinal inner walls of the longitudinal grooves of the rails when the rod support member is in its locked position, the inner walls forming for the support ends said support points and
    the elongated flexible support member is arranged to turn the rod-like support member and its support ends so that the gripping edges of the rod support member wedge by biting into the longitudinal inner walls of the grooves of the first and second rails to bring the rod support member into its locked position the rod support member comprising power transmission brackets in cooperation with the elongated flexible member, which are arranged to transmit a torque to the rod support member for turning, when the elongated flexible member is tightened with the means for tightening connected thereto and arranged to uphold a torque exerted on the rod support member and keep the rod support member in its locked position so that free movement relative to the transportation unit is prevented.

3. The support arrangement as claimed in claim 1, wherein each support end of the rod support member comprises a first diameter that is smaller than a width of the longitudinal grooves of the first and second rails, and a second diameter that is larger than the width of the longitudinal grooves.

4. The support arrangement as claimed in claim 2, wherein the power transmission brackets are arranged close to the support ends of the rod support member.

5. The support arrangement as claimed in claim 2, wherein the transmission brackets are arranged in a longitudinal direction of the rod support member at a distance from each other.

6. The support arrangement as claimed in claim 1, wherein the first support end of the rod support member has a locking tongue and the first rail comprises a locking stopper to receive the locking tongue in such a manner that a movement of the first rail relative to a longitudinal direction of the rod support member is substantially prevented.

7. The support arrangement as claimed in claim 1, wherein a cross-section of the rod support member is a circle.

8. The support arrangement as claimed in claim 1, wherein a surface of the longitudinal inner walls of the longitudinal grooves of the first rail and the second rail deviate from smooth inner walls.

9. The support arrangement as claimed in claim 8, wherein the longitudinal inner walls of the longitudinal grooves of the first rail and the second rail comprise locking teeth for receiving respective gripping edges in the first support end and the second support end of the rod support member and for locking the gripping edge at the respective ones of said support points of the first and second rails.

10. The support arrangement as claimed in claim 9, wherein a distance between the locking teeth is smaller than a diameter of the rod support member.

11. The support arrangement as claimed in claim 2, wherein the longitudinal inner walls of the longitudinal grooves of the first rail and the second rail are smooth for placing when the rod support member is in a shift position the rod support member steplessly along said grooves against the load to be supported, whereby the diametrically positioned gripping edges of the rod support member are arranged to bite into the smooth inner walls of the longitudinal grooves when the rod support member is in its locked position.

12. The support arrangement as claimed in claim 2, comprising a further rod support member, said rod support members being arranged on opposite sides of the load to be supported and close to the load to support the load, the elongated flexible member being arranged around the power transmission brackets of the rod support members to turn the rod support members and lock their gripping edges into the longitudinal inner walls of the longitudinal grooves in the rails, when the elongated flexible member is tightened.

13. The support arrangement as claimed claim 2, wherein the gripping edges of the rod support member are made of a material that is strong and hard and stronger and harder than a material of the rails.

14. A transportation unit comprising the support arrangement as claimed in claim 1, wherein the transportation unit comprises a chute for receiving a reel in such a manner that a mantle surface of the reel is supported by inner walls of the chute and the rod support member is arranged above a centre axis of the reel.

15. A transportation unit comprising a support arrangement according to claim 1.

16. The transportation unit according to claim 15, where the transportation unit is a container.

17. The transportation unit according to claim 15, wherein the transportation unit is a vehicle.

18. A support arrangement for supporting load in a transportation unit, comprising:
   a rod support member comprising a first support end and a second support end;
   a first rail and a second rail parallel to a longitudinal axis of the transportation unit, each rail comprising a wall structure which forms longitudinal grooves and support points arranged in a longitudinal direction of the rails for receiving the rod support member at a given support point beside the load to support the rod support member;
   a first support point in the first rail for positioning the first support end; and
   a second support point in the second rail for positioning the second support end so that the rod member is at right angles to the longitudinal axis of the transportation unit;
   longitudinal inner walls of the longitudinal grooves of the rails configured so that the rod support member is arranged to be displaceable along the first and second rails guided by the longitudinal inner walls of the longitudinal grooves of the rails;
   an elongated flexible member; and
   a tightening element configured for tightening the elongated flexible member in such a way that the load is pressed between the rod support member and the elongated flexible member, the rod support member supporting the load on one side and the elongated flexible member supporting the load on an opposite side.

19. The support arrangement according to claim 18, wherein the tightening element is a rigging screw.

* * * * *